US012592448B2

(12) United States Patent
Ryu et al.

(10) Patent No.: US 12,592,448 B2
(45) Date of Patent: Mar. 31, 2026

(54) BATTERY MODULE, AND BATTERY PACK AND VEHICLE COMPRISING SAME

(71) Applicant: LG ENERGY SOLUTION, LTD., Seoul (KR)

(72) Inventors: Sang-Woo Ryu, Daejeon (KR); Jong-Hyun Jo, Daejeon (KR); Yong-Seok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 564 days.

(21) Appl. No.: 17/922,811

(22) PCT Filed: Nov. 16, 2021

(86) PCT No.: PCT/KR2021/016810
§ 371 (c)(1),
(2) Date: Nov. 2, 2022

(87) PCT Pub. No.: WO2022/149708
PCT Pub. Date: Jul. 14, 2022

(65) Prior Publication Data
US 2023/0170577 A1 Jun. 1, 2023

(30) Foreign Application Priority Data
Jan. 8, 2021 (KR) ........................ 10-2021-0002877

(51) Int. Cl.
*H01M 50/358* (2021.01)
*H01M 50/383* (2021.01)
(52) U.S. Cl.
CPC ....... *H01M 50/358* (2021.01); *H01M 50/383* (2021.01); *H01M 2220/20* (2013.01)

(58) Field of Classification Search
CPC ............. H01M 50/358; H01M 50/383; H01M 2220/20
See application file for complete search history.

(56) References Cited

U.S. PATENT DOCUMENTS 7,844,400 B1 * 11/2010 Selman ................... E21B 35/00
73/19.09
11,211,647 B2 * 12/2021 Itai ...................... H01M 10/625
(Continued)

FOREIGN PATENT DOCUMENTS

CN 1842927 A 10/2006
CN 209947989 U 1/2020
(Continued)

OTHER PUBLICATIONS

European Search Report for European Application No. 21917870.4, dated Feb. 26, 2024.
(Continued)

*Primary Examiner* — Jennifer Dieterle
(74) *Attorney, Agent, or Firm* — Birch, Stewart, Kolasch & Birch, LLP

(57) ABSTRACT

A battery module includes a battery cell stack in which a plurality of battery cells are stacked; a case configured to accommodate the battery cell stack and having a first discharge hole formed to discharge gas; an exhaust path member having a hole formed to communicate with the first discharge hole and mounted to the case to provide a discharge path of the gas so as to discharge the gas and prevent flame from leaking; and a cover coupled to the case to cover the exhaust path member and having a second discharge hole through which the gas moving through the exhaust path member is discharged.

15 Claims, 9 Drawing Sheets

(56)                    References Cited

U.S. PATENT DOCUMENTS

| | | | |
|---|---|---|---|
| 2007/0020511 A1 | 1/2007 | Stocchiero | |
| 2012/0164490 A1* | 6/2012 | Itoi | H01M 50/358 |
| | | | 429/82 |
| 2015/0140369 A1 | 5/2015 | Itoi et al. | |
| 2018/0062133 A1* | 3/2018 | Kim | H01M 10/482 |
| 2018/0108892 A1 | 4/2018 | Kim et al. | |
| 2019/0088914 A1 | 3/2019 | Choi et al. | |
| 2019/0334143 A1 | 10/2019 | Sugeno | |
| 2020/0099114 A1 | 3/2020 | Ryu et al. | |
| 2020/0227708 A1 | 7/2020 | Ahn et al. | |
| 2022/0069411 A1* | 3/2022 | Wakabayashi | H01M 50/227 |
| 2022/0077540 A1* | 3/2022 | Wakabayashi | H01M 50/394 |
| 2023/0051278 A1* | 2/2023 | Ryu | H01M 50/383 |
| 2024/0106037 A1* | 3/2024 | Ryu | H01M 50/271 |

FOREIGN PATENT DOCUMENTS

| | | | |
|---|---|---|---|
| CN | 112038528 A | 12/2020 | |
| EP | 4 024 593 A1 | 7/2022 | |
| EP | 4 080 659 A1 | 10/2022 | |
| JP | 2002-216731 A | 8/2002 | |
| JP | 2011-204577 A | 10/2011 | |
| JP | 2014-197452 A | 10/2014 | |
| JP | 2015-133266 A | 7/2015 | |
| JP | 2015-135763 A | 7/2015 | |
| JP | 2015-211025 A | 11/2015 | |
| JP | 2018-37217 A | 3/2018 | |
| JP | 6631726 B2 | 1/2020 | |
| KR | 10-2012-0090027 A | 8/2012 | |
| KR | 10-2017-0090261 A | 8/2017 | |
| KR | 10-1799238 B1 | 11/2017 | |
| KR | 10-2019-0086853 A | 7/2019 | |
| KR | 10-1998224 B1 | 7/2019 | |
| KR | 10-2019-0094921 A | 8/2019 | |
| KR | 10-2030726 B1 | 10/2019 | |
| KR | 10-2058197 B1 | 1/2020 | |
| KR | 10-2061872 B1 | 1/2020 | |
| WO | WO2019/176415 A1 | 9/2019 | |
| WO | WO-2020152992 A1 * | 7/2020 | ........ H01M 10/0525 |

OTHER PUBLICATIONS

International Search Report (PCT/ISA/210) issued in PCT/KR2021/016810 mailed on Mar. 2, 2022.

* cited by examiner

BATTERY MODULE, AND BATTERY PACK AND VEHICLE COMPRISING SAME

TECHNICAL FIELD

The present application claims priority to Korean Patent Application No. 10-2021-0002877 filed on Jan. 8, 2021, in the Republic of Korea, the disclosures of which are incorporated herein by reference.

The present disclosure relates to a battery module, and a battery pack and a vehicle including the battery module, and more particular, to a battery module, which discharges gas but does not discharge flame when fire occurs in a battery cell, and a battery pack and a vehicle including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an exterior, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

The lithium secondary battery is currently in the spotlight due to their advantages such as high operating voltage and extremely high energy density. However, since an organic electrolyte is used, if the lithium secondary battery is overcharged, it causes overcurrent and overheating, which in severe cases may cause explosion or fire due to ignition.

Various types of secondary batteries include a battery module having a case capable of protecting battery cells so that a plurality of battery cells are stacked and inserted in the case, and a battery pack including a plurality of battery modules.

Here, when a flame occurs in at least one of the battery cells inside the case of the battery module, if the flame leaks out of the case of the battery module, it may spread to other battery modules and may cause a dangerous situation to the user. For example, if a flame is generated in a battery cell while a battery module or battery pack is installed in an electric vehicle and the flame is leaked to the outside, a driver who is driving the electric vehicle may be burned or put into a dangerous situation.

DISCLOSURE

Technical Problem

Therefore, the present disclosure is directed to providing a battery module, which may discharge gas out of a case but prevents flame from being discharged when flame occurs in a battery cell, and a battery pack and a vehicle including the battery module.

Technical Solution

In one aspect of the present disclosure, there is provided a battery module, comprising: a battery cell stack in which a plurality of battery cells are stacked; a case configured to accommodate the battery cell stack and having at least one first discharge hole formed to discharge gas; an exhaust path member having an interior communicating with the at least one first discharge hole and mounted to the case to provide a discharge path of the gas so as to discharge the gas and prevent flame from leaking; and a cover coupled to the case to cover the exhaust path member and having at least one second discharge hole through which the gas moving through the exhaust path member is discharged.

Also, the at least one first discharge hole formed in the case and the at least one second discharge hole formed in the cover may be formed in opposite sides of the battery module, and the gas may flow into the exhaust path member from the at least one first discharge hole, move through the exhaust path member, and flow out through the at least one second discharge hole.

In addition, the case may include a lower cover configured to accommodate the battery cell stack; and an upper cover coupled to the lower cover and having a plurality of mounting grooves at which the exhaust path member is mounted and having the at least one first discharge hole formed therein, the cover may be coupled to the upper cover, and the exhaust path member may be located between the cover and the upper cover.

Also, the exhaust path member may be mounted to the plurality of mounting grooves so that the interior communicates with the at least one first discharge hole.

In addition, the exhaust path member may include a plurality of exhaust pillars respectively mounted to the plurality of mounting grooves; and a plurality of exhaust pipes configured to connect the plurality of exhaust pillars with each other.

Also, each of the plurality of exhaust pillars may include an upper part having a first connection hole connected to a first exhaust pipe of the plurality of exhaust pipes and having a hollow inside; a lower part coupled to the upper part, having a second connection hole connected to a second exhaust pipe of the plurality of exhaust pipes, and having a hollow inside; and an inner shaft inserted into a portion where the upper part and the lower part are connected, the inner shaft having a first movement hole communicating with the first connection hole and a second movement hole communicating with the second connection hole, the inner shaft having a hollow inside.

In addition, each of the plurality of exhaust pillars may include a top cap having a first hole and coupled to the upper part; and a bottom cap having a second hole and coupled to the lower part.

Also, the upper part and the lower part may be rotatably coupled with each other.

In addition, the plurality of exhaust pillars may be respectively connected to the plurality of exhaust pipes, and the exhaust path member may be configured to be expandable by rotation of the upper part and the lower part.

Also, the first hole may be configured to communicate with the at least one second discharge hole of the cover, and the second hole may be configured to communicate with the at least one first discharge hole of the case.

In addition, the battery module may further comprise a closing member configured to close at least one of the first connection hole and the second connection hole.

Also, the battery module may further comprise a plate made of mica with heat insulation and heat resistance to prevent flame from leaking.

Meanwhile, in another aspect of the present disclosure, there is also provided a battery pack comprising the battery module or a vehicle comprising the battery module.

The case may have a lower cover configured to accommodate the battery cell stack and an upper cover coupled to the lower cover, a plurality of mounting grooves formed in the upper cover, and at least one mounting groove having the at least one first discharge hole, wherein the exhaust path member is retained in the plurality of mounting grooves.

Advantageous Effects

According to the embodiments of the present disclosure, it is possible to discharge gas out of a case but prevent flame from being discharged by means of an exhaust path member mounted to the case when flame occurs in a battery cell.

DESCRIPTION OF DRAWINGS

FIG. 2 is an exploded perspective view showing the battery module according to an embodiment of the present disclosure.

FIG. 5 is an assembled perspective view showing an exhaust path member in the battery module according to an embodiment of the present disclosure.

FIGS. 7(*a*) and 7(*b*) are diagrams showing that an upper part and a lower part of an exhaust pillar rotate in the battery module according to an embodiment of the present disclosure.

FIGS. 9 and 11 are diagrams showing other embodiments in which the exhaust path member is deformed and coupled to the upper cover in the battery module according to an embodiment of the present disclosure.

BEST MODE

Figure 1:
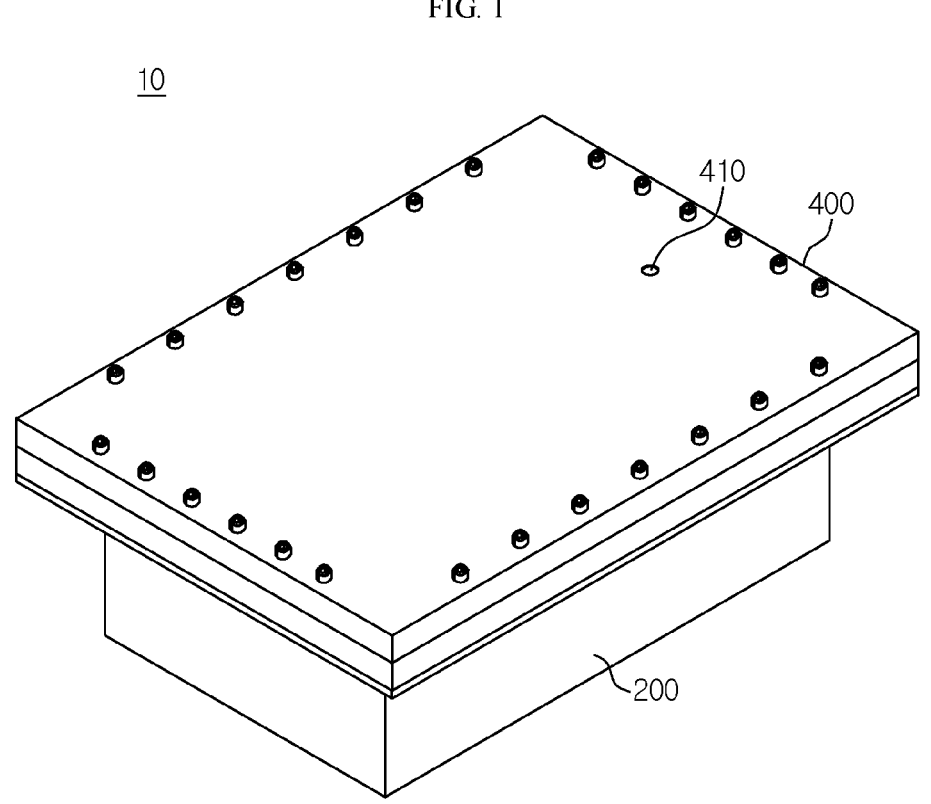
FIG. 1 is an assembled perspective view showing a battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'coupling' or 'connecting' as used herein, may refer not only to a case where one member and another member are directly combined or directly connected but also a case where one member is indirectly combined with another member via a connecting member or is indirectly connected.

Figure 2:
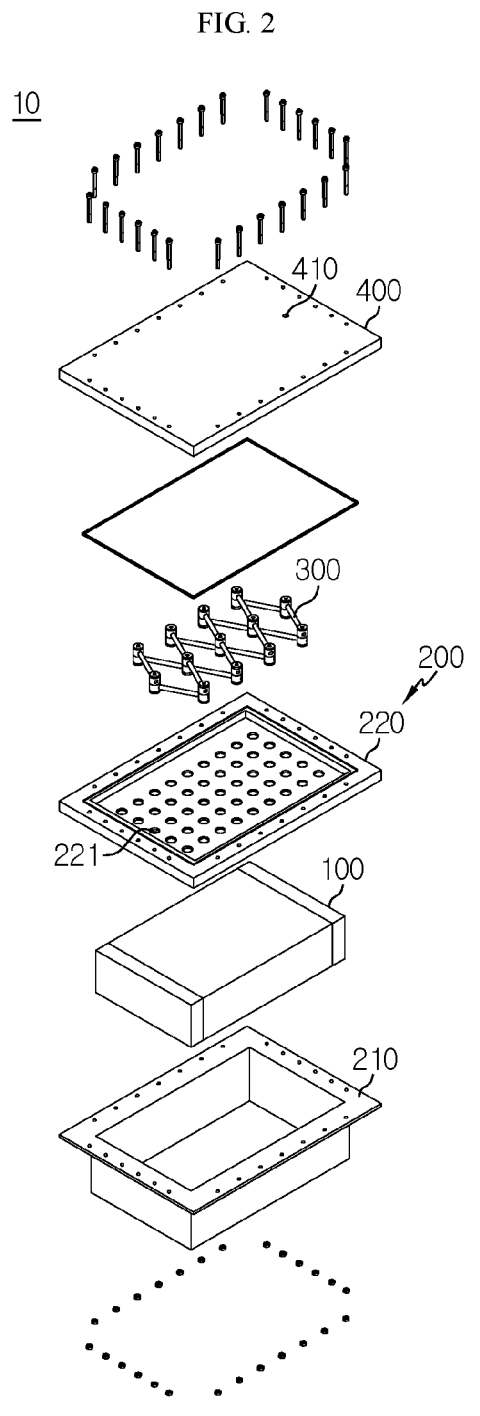
Figure 3:
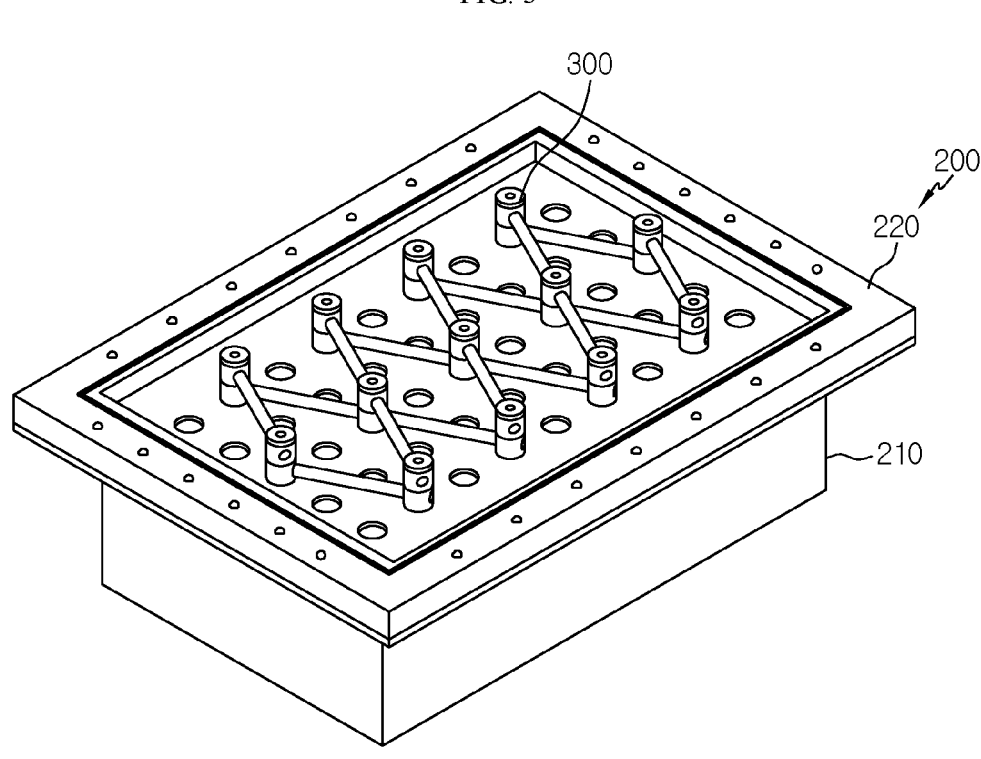
FIG. 3 is a perspective view showing that a cover is removed from the battery module according to an embodiment of the present disclosure.
Figure 4:
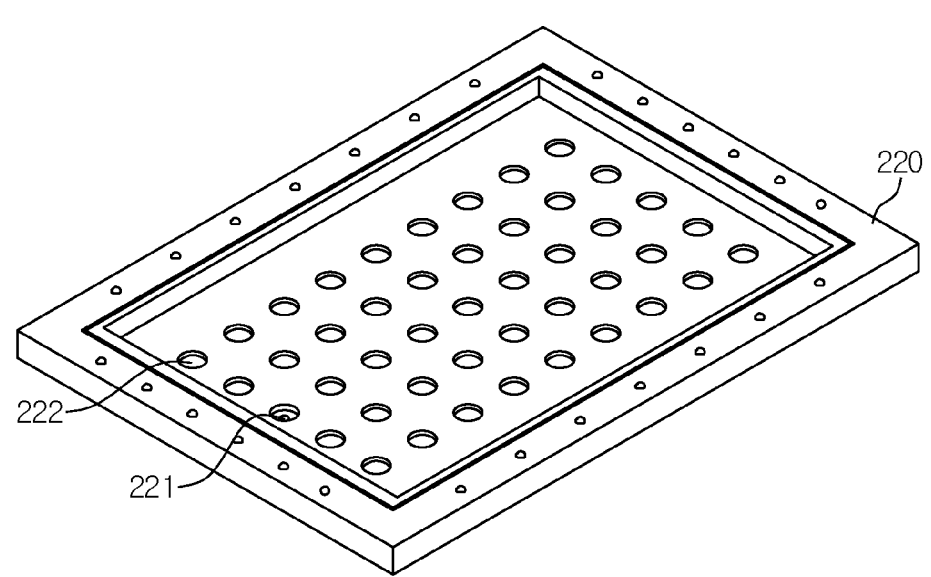
FIG. 4 is a diagram showing an upper cover having a first discharge hole in the battery module according to an embodiment of the present disclosure.
Figure 5:
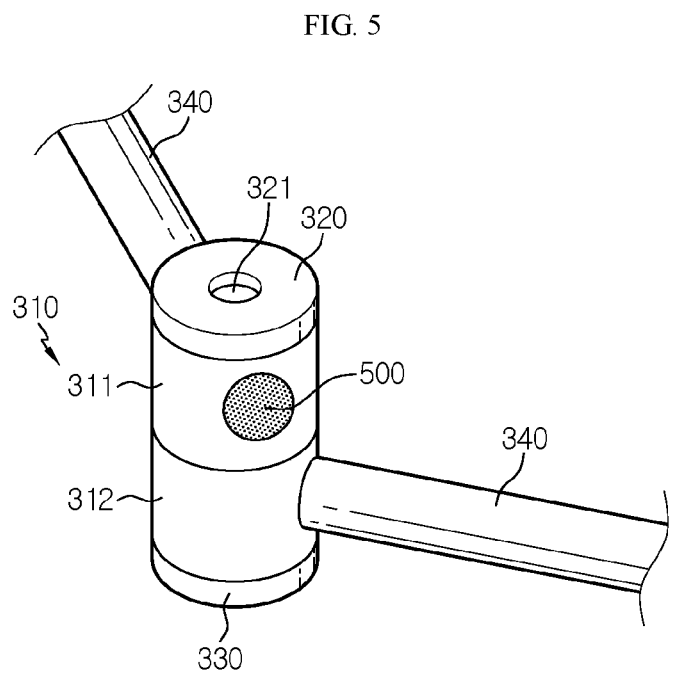
Figure 6:
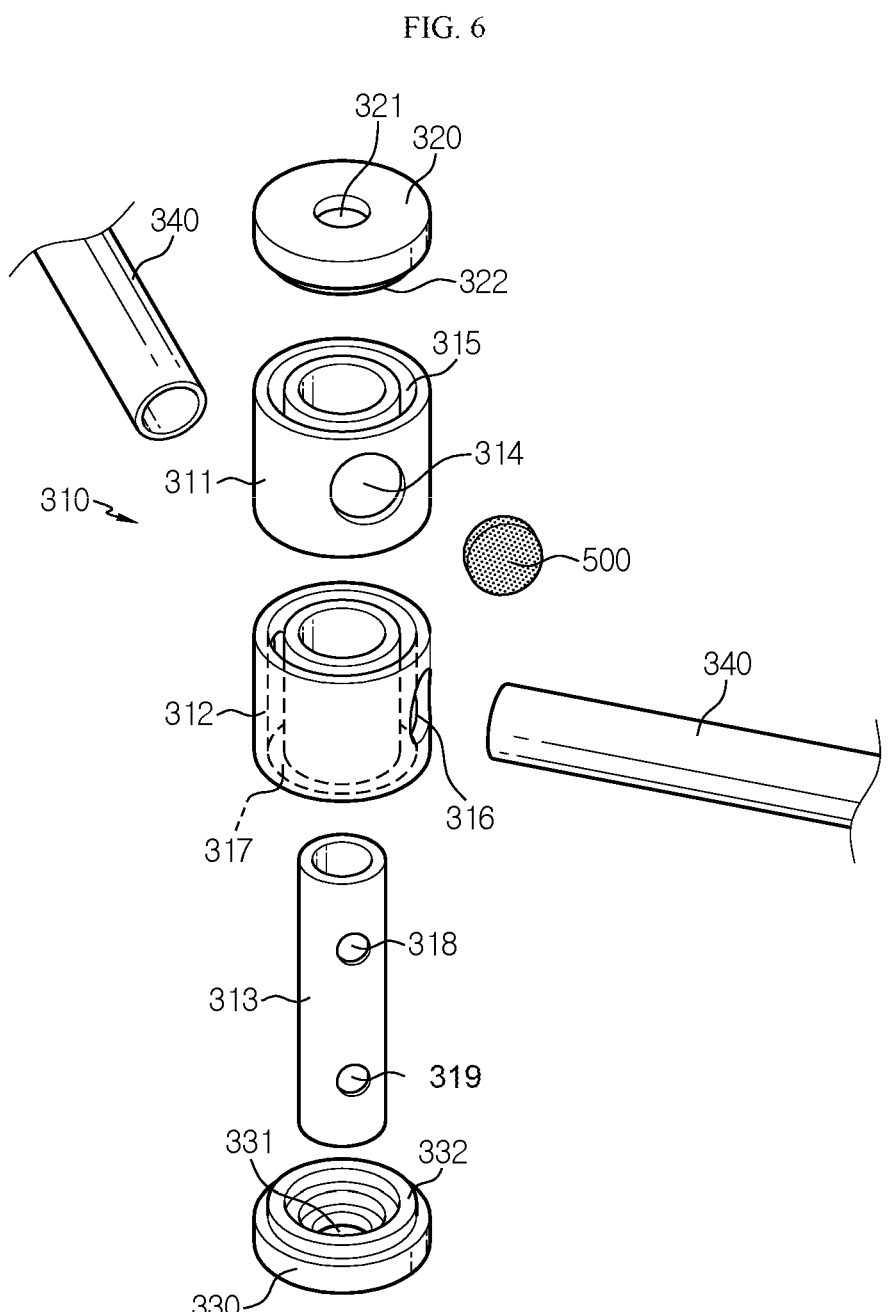
FIG. 6 is an exploded perspective view showing the exhaust path member of FIG. 5 in the battery module according to an embodiment of the present disclosure.
Figure 7:
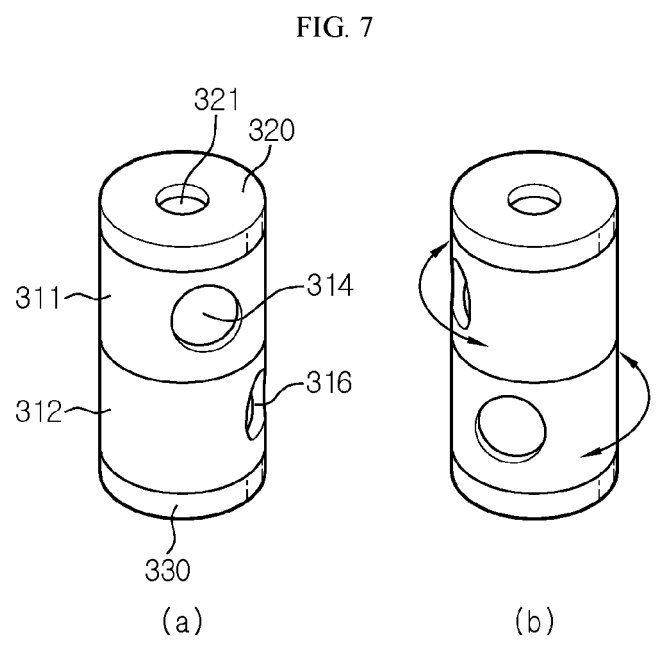
Figure 8:
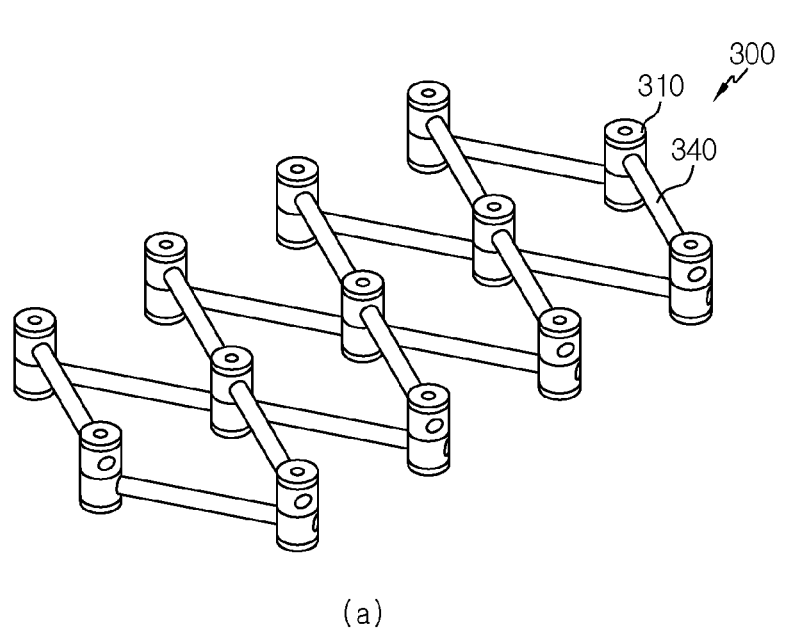
FIGS. 8(*a*) and 8(*b*) are diagrams showing that an exhaust path member is newly constructed in the battery module according to an embodiment of the present disclosure.
Figure 8:
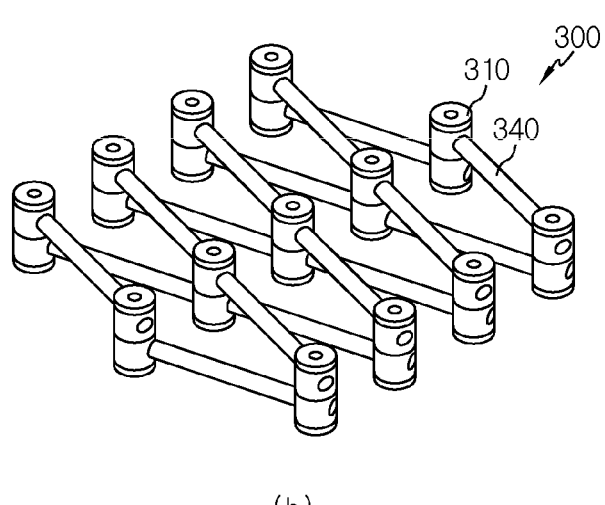

FIG. 1 is an assembled perspective view showing a battery module according to an embodiment of the present disclosure, FIG. 2 is an exploded perspective view showing the battery module according to an embodiment of the present disclosure, FIG. 3 is a perspective view showing that a cover is removed from the battery module according to an embodiment of the present disclosure, FIG. 4 is a diagram showing an upper cover having a first discharge hole in the battery module according to an embodiment of the present disclosure, FIG. 5 is an assembled perspective view showing an exhaust path member in the battery module according to an embodiment of the present disclosure, FIG. 6 is an exploded perspective view showing the exhaust path member of FIG. 5 in the battery module according to an embodiment of the present disclosure, FIGS. 7(*a*) and 7(*b*) are diagrams showing that an upper part and a lower part of an exhaust pillar rotate in the battery module according to an embodiment of the present disclosure, and FIGS. 8(*a*) and 8(*b*) are diagrams showing that an exhaust path member is newly constructed in the battery module according to an embodiment of the present disclosure.

Referring to the figures, a battery module 10 according to an embodiment of the present disclosure includes a battery cell stack 100, a case 200, an exhaust path member 300, and a cover 400.

In the battery cell stack 100, a plurality of battery cells provided with electrode leads are stacked. The electrode leads provided in the battery cell are exposed to the outside and may be made of a conductive material to serve as a kind of terminals connected to an external device.

The electrode leads may include a positive electrode lead and a negative electrode lead. The positive electrode lead and the negative electrode lead may be disposed in opposite directions with respect to the longitudinal direction of the battery cell, or the positive electrode lead and the negative electrode lead may be located in the same direction with respect to the longitudinal direction of the battery cell.

The positive electrode lead and the negative electrode lead may be made of various materials. For example, the positive electrode lead may be made of an aluminum material, and the negative electrode lead may be made of a copper material.

The electrode leads may be electrically coupled to a bus bar (not shown). The battery cell may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell stack 100 may be configured such that a plurality of battery cells are stacked on each other. Here, the battery cell may have various structures, and a plurality of battery cells may be stacked in various ways.

The battery cell stack 100 may include a plurality of cartridges (not shown) for respectively accommodating the battery cells. Each cartridge (not shown) may be manufactured by injection-molding plastic, and a plurality of cartridges (not shown), each having an accommodation portion capable of accommodating the battery cell, may be stacked.

A cartridge assembly in which the plurality of cartridges (not shown) are stacked may have a connector element or a terminal element. The connector element may include, for example, various types of electrical connection parts or members for connection to a battery management system (BMS) that may provide data on voltage or temperature of the battery cell.

In addition, the terminal element includes a positive terminal and a negative terminal as main terminals connected to the battery cell, and the terminal element may have a terminal bolt to be electrically connected to the outside. Meanwhile, the battery cell may have various shapes.

Referring to FIGS. 1 and 2, the battery cell stack 100 is accommodated in the case 200, and a first discharge hole 221 (see FIG. 4) for discharging gas is formed. For example, the case 200 may be provided to surround the battery cell stack 100.

The case 200 surrounds the battery cell stack 100 entirely, thereby protecting the battery cell stack 100 from external vibration or impact.

The case 200 may be shaped corresponding to the shape of the battery cell stack 100. For example, if the battery cell stack 100 is provided in a hexahedral shape, the case 200 may also be provided in a hexahedral shape to correspond thereto.

The case 200 may be manufactured by, for example, bending a metal plate, and may also be manufactured in an integral type or a separable type. Here, the case 200 may be made of a steel material that may withstand the flame, but the material of the case 200 is not limited to steel and may include various metals.

In addition, the case 200 may include a mica plate made of mica having heat insulation and heat resistance to prevent the leakage of flame. Here, the mica plate may include not only a flat mica plate, but also a mica plate of shape in which a flat surface and a curved surface are mixed.

Referring to FIGS. 1 and 2, the case 200 may include a lower cover 210 and an upper cover 220. The battery cell stack 100 is accommodated in the lower cover 210.

The upper cover 220 is coupled to the lower cover 210. Referring to FIG. 4, a plurality of mounting grooves 222 at which the exhaust path member 300 is mounted and a first discharge hole 221 are formed in the upper cover 220. The exhaust path member 300 may be fixed to the mounting groove 222 by press-fitting.

In addition, the first discharge hole 221 communicates with a second hole 331 (see FIG. 6) of the exhaust path member 300, and is provided so that the gas generated inside the case 200 moves to the exhaust path member 300 through the first discharge hole 221 of the upper cover 220.

The case 200 may have a perforated portion (not shown) formed therein so that the connector element or the terminal element may be exposed therethrough to the outside. That is, the connector element or the terminal element may be electrically connected to a predetermined external component or member, and the perforated portion may be formed in the case 200 so that the electrical connection is not disturbed by the case 200.

A hole communicating with the first discharge hole 221, for example the second hole 331, is formed in the exhaust path member 300, and is mounted to the case 200 to provide a gas discharge path. That is, when a flame is generated and gas is generated in at least one of the battery cells arranged inside the case 200, the gas inside the case 200 is discharged through the exhaust path member 300, but the flame is prevented from being discharged by the case 200.

Referring to FIGS. 1 to 4, the exhaust path member 300 communicates with the first discharge hole 221 formed in the case 200 and also communicates with a second discharge hole 410 formed in the cover 400. That is, the gas inside the case 200 flows into the exhaust path member 300 through the first discharge hole 221, moves through the exhaust path member 300, and is discharged out of the case 200 through the second discharge hole 410 of the cover 400.

At this time, since the flame generated inside the case 200 may leak through the first discharge hole 221, referring to FIG. 2, the first discharge hole 221 formed in the case 200 and the second discharge hole 410 formed in the cover 400 need be separated far away.

That is, the first discharge hole 221 formed in the case 200 and the second discharge hole 410 formed in the cover 400 are formed in opposite directions. Since the flame basically moves upward, according to the above structure, even if the flame moves upward through the first discharge hole 221, the flame cannot move left and right through the exhaust path member 300, and thus the flame cannot move to the second discharge hole 410 formed opposite to the first discharge hole 221.

As a result, the gas may flow into the exhaust path member 300 from the first discharge hole 221, move through the exhaust path member 300, and may flow out to the second discharge hole 410, but the flame cannot be discharged through the second discharge hole 410.

The exhaust path member 300 is mounted to the plurality of mounting grooves 222 formed in the upper cover 220 of the case 200. Here, the first discharge hole 221 is formed in at least one of the plurality of mounting grooves 222, and the second hole 331 formed in the exhaust path member 300 is mounted to the mounting groove 222 to communicate with the first discharge hole 221.

That is, the gas generated inside the case 200 may move from the case 200 to the exhaust path member 300 through the first discharge hole 221 of the upper cover 220 and the second hole 331 of the exhaust path member 300.

Referring to FIGS. 3, 5 and 6 together, the exhaust path member 300 includes a plurality of exhaust pillars 310 and a plurality of exhaust pipes 340.

The exhaust pillar 310 is provided in plural, and the plurality of exhaust pillars 310 are respectively mounted to the plurality of mounting grooves 222. In addition, the second hole 331 communicating with the first discharge hole 221 is formed in the exhaust pillar 310. That is, when the exhaust pillar 310 is mounted on the mounting groove 222, the second hole 331 formed in the exhaust pillar 310 communicates with the first discharge hole 221 formed in the upper cover 220.

In addition, the plurality of exhaust pillars 310 are respectively connected to the plurality of exhaust pipes 340, explained later, and gas may move through the exhaust pillar 310 and the exhaust pipe 340.

Referring to FIGS. 5 and 6, the exhaust pillar 310 may include an upper part 311, a lower part 312, and an inner shaft 313, and may further include a top cap 320 and a bottom cap 330.

In the upper part 311, the first connection hole 314 connected to the exhaust pipe 340 is formed, and the upper part 311 has a hollow inside. That is, the exhaust pipe 340 is connected to the first connection hole 314, and gas can move through the hollow inside the upper part 311 to move from the upper part 311 of the exhaust pillar 310 to the exhaust pipe 340.

Referring to FIGS. 5 and 6, when the first connection hole 314 of the upper part 311 is not used, the first connection hole 314 may be configured to be closed by the closing member 500. Here, the closing member 500 may be made of various materials, for example a rubber material. However, the material of the closing member 500 is not limited thereto.

In the lower part 312, the second connection hole 316 connected to the exhaust pipe 340 is formed, and the lower part 312 has a hollow inside. That is, the exhaust pipe 340 is connected to the second connection hole 316, and after the gas moves from the exhaust pipe 340 to the lower part 312 of the exhaust pillar 310, the gas may move through the hollow inside the lower part 312.

Like the upper part 311, the second connection hole 316 of the lower part 312 may be configured to be closed by the closing member 500 when not in use. The material of the closing member 500 closing the lower part 312 is common with the material of the closing member 500 closing the upper part 311.

The inner shaft 313 is inserted into a portion where the upper part 311 and the lower part 312 are connected to support the upper part 311 and the lower part 312. A first movement hole 318 communicating with the first connection hole 314 of the upper part 311 is formed in the inner shaft 313, and a second movement hole 319 communicating with the second connection hole 316 of the lower part 312 is formed in the inner shaft 313.

The inside of inner shaft 313 is hollow, and the gas moved to inner shaft 313 moves upward through the hollow inside.

That is, the gas moving to the lower part 312 through the exhaust pipe 340 connected to the lower part 312 moves into the inner shaft 313 through the second movement hole 319 of the inner shaft 313 communicating with the second connection hole 316 of the lower part 312, moves upward to the upper part 311 through the inside hollow of the inside shaft 313, and then moves from the inside of inner shaft 313 to the exhaust pipe 340 connected to the upper part 311 through the first movement hole 318 of the inner shaft 313 communicating with the first connection hole 314 of the upper part 311.

The top cap 320 has a first hole 321 and is coupled to the upper part 311. A method of coupling the top cap 320 to the upper part 311 will be described later. Since the exhaust pillar 310 is provided in plural, a plurality of top caps 320 respectively coupled to the plurality of exhaust pillars 310 are also provided.

Here, the first hole 321 formed in one top cap 320 among the plurality of top caps 320 communicates with the second discharge hole 410 formed in the cover 400. Here, since the first hole 321 formed in another top cap 320 among the plurality of top caps 320 is closed by contacting the cover 400, gas may be discharged out of the cover 400 only through the first hole 321 communicating with the second discharge hole 410.

However, this is only one embodiment, and a plurality of second discharge holes 410 may be formed in the cover 400. In this case, the first hole 321 of the top cap 320 may be provided to communicate with each of the plurality of second discharge holes 410.

In addition, as described above, when the gas introduced into the lower part 312 through the exhaust pipe 340 moves to the upper part 311 through the hollow of the inner shaft 313, the gas may be discharged out of the cover 400 through the second discharge hole 410 communicating with the first hole 321.

The bottom cap 330 has a second hole 331 and is coupled to the lower part 312. The method of coupling the bottom cap 330 to the lower part 312 will be described later. Since a plurality of exhaust pillars 310 are provided, a plurality of bottom caps 330 respectively coupled to the plurality of exhaust pillars 310 are also provided.

Here, the second hole 331 formed in one bottom cap 330 among the plurality of bottom caps 330 communicates with the first discharge hole 221 formed in the upper cover 220 of the case 200. Here, since the second hole 331 formed in another bottom cap 330 among the plurality of bottom cap 330 is closed by contacting the upper cover 220, the gas may move from the case 200 to the lower part 312 only through the second hole 331 communicating with the first discharge hole 221.

However, this is only one embodiment, and a plurality of first discharge holes 221 may be formed in the upper cover 220. In this case, the second hole 331 of the bottom cap 330 may be provided to communicate with each of the plurality of first discharge holes 221.

The upper part 311 is coupled to the lower part 312, and the lower part 312 is coupled to the upper part 311. Here, the method of coupling the upper part 311 to the lower part 312 is various. For example, the inner shaft 313 may be inserted into the center of the upper part 311 and the lower part 312 by press-fitting, so that the upper part 311 and the lower part 312 may be coupled.

In addition, referring to FIG. 6, coupling protrusions 322, 332 are formed on the top cap 320 and the bottom cap 330, respectively, and coupling grooves 315, 317 are formed in the upper part 311 and the lower part 312, respectively. Also, the coupling protrusion 322 of the top cap 320 may be coupled to the coupling groove 315 of the upper part 311, and the coupling protrusion 332 of the bottom cap 330 may be coupled to the coupling groove 317 of the lower part 312.

Accordingly, as shown in FIG. 5, the upper part 311, the lower part 312 and the inner shaft 313 of the exhaust pillar 310 may be coupled to the top cap 320 and the bottom cap 330.

Meanwhile, referring to FIGS. 7(a) and 7(b), the upper part 311 and the lower part 312 may be rotatably coupled to each other. If the upper part 311 and the lower part 312 are rotatably coupled in this way, as in FIGS. 8(a) and 8(b), the exhaust path member 300 may be provided to be stretchable by rotation of the upper part 311 and the lower part 312.

When the exhaust path member 300 is unfolded as shown in FIG. 8(a), the exhaust path member 300 may be mounted to the mounting groove 222 of the upper cover 220, and when the exhaust path member 300 is folded as shown in FIG. 8(*b*), the exhaust path member 300 may be easily stored.

The exhaust pipe 340 is provided in plural, and the plurality of exhaust pipes 340 are provided to connect the plurality of exhaust pillars 310 to each other. That is, referring to FIGS. 5 and 6, the exhaust pipe 340 is connected to the first connection hole 314 of the upper part 311 and is also connected to the second connection hole 316 of the lower part 312. In addition, inside the exhaust pipe 340, a hollow is formed through which gas may move.

Referring to FIG. 2, the cover 400 is coupled to the case 200 to cover the exhaust path member 300, and the second discharge hole 410 through which the gas moved through the exhaust path member 300 is discharged is formed in the cover 400. Here, the cover 400 is coupled to the upper cover 220, and the exhaust path member 300 is located between the cover 400 and the upper cover 220 to communicate with the first discharge hole 221 of the upper cover 220 and the second discharge hole 410 of the cover 400, respectively.

That is, the gas generated inside the case 200 moves to the exhaust path member 300 through the first discharge hole 221 of the upper cover 220 and is discharged from the exhaust path member 300 through the second discharge hole 410 of the cover 400 to the outside.

Figure 9:
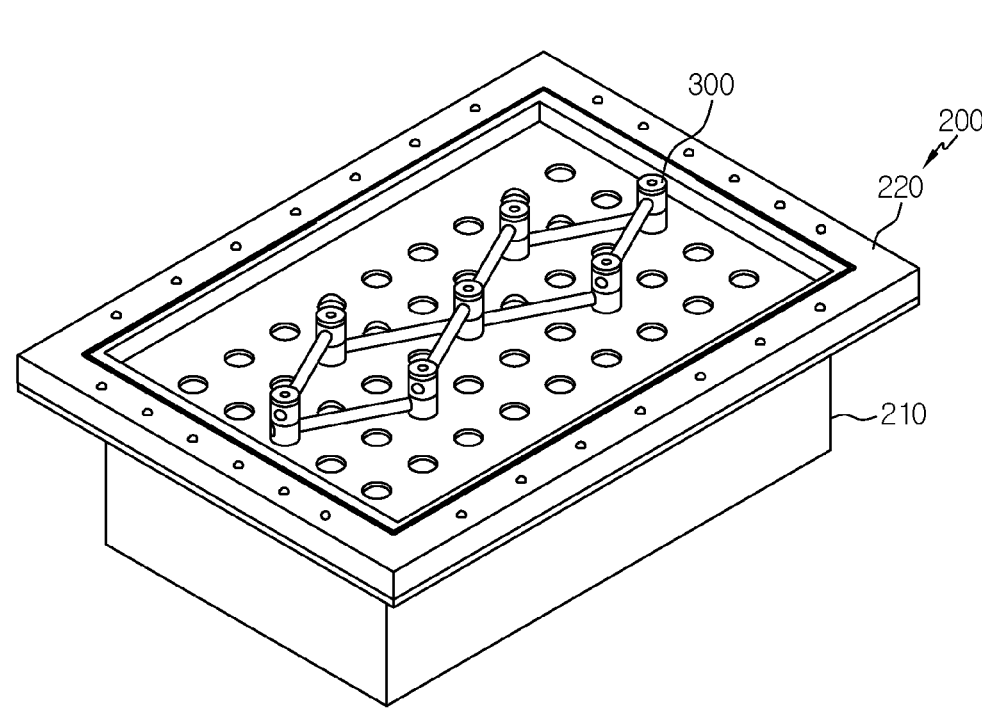
Figure 11:
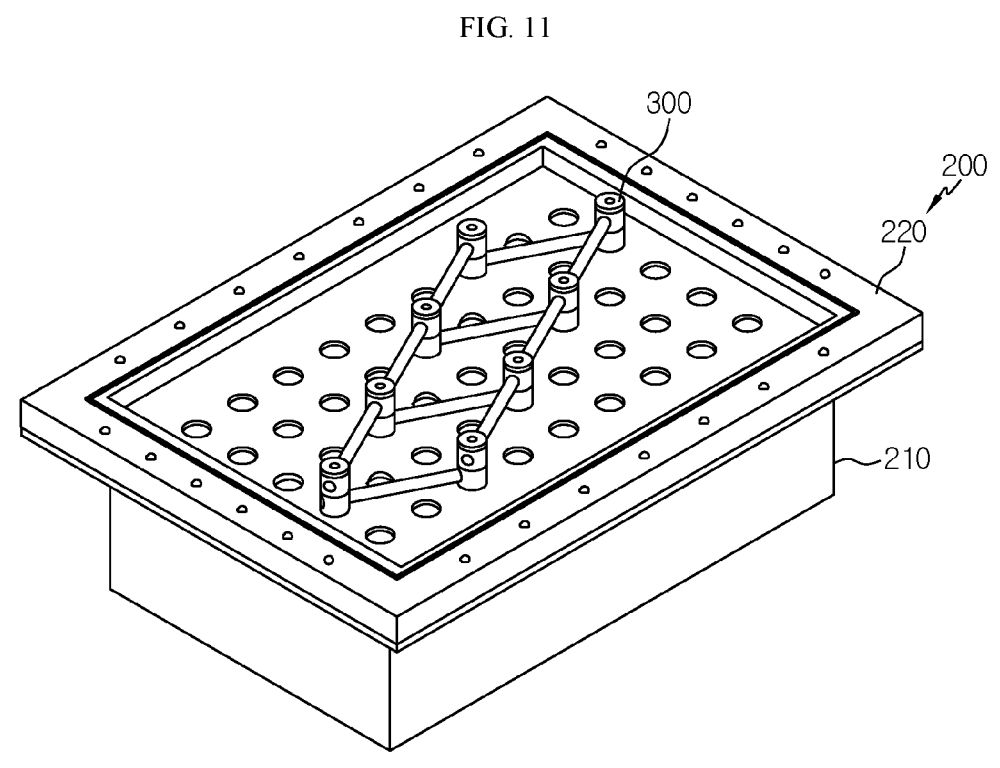

FIGS. 9 and 11 are diagrams showing other embodiments in which the exhaust path member 300 is deformed and coupled to the upper cover 220 in the battery module 10 according to an embodiment of the present disclosure.

Hereinafter, the operation and effect of the battery module 10 according to an embodiment of the present disclosure will be described with reference to the drawings.

Referring to FIG. 2, the battery cell stack 100 is accommodated in the case 200. Referring to FIG. 4, the first discharge hole 221 is formed in the upper cover 220 of the case 200, and the first discharge hole 221 communicates with the second hole 331 formed in the bottom cap 330 of the exhaust pillar 310.

In addition, referring to FIGS. 2 and 4, the second discharge hole 410 of the cover 400 is formed at an opposite side away from the first discharge hole 221 of the upper cover 220. In addition, the second discharge hole 410 of the cover 400 communicates with the first hole 321 formed in the top cap 320 of the exhaust pillar 310.

Meanwhile, since the exhaust pillar 310 is connected to the exhaust pipe 340, the gas generated by ignition of the battery cell inside the case 200 moves to the exhaust pillar 310 through the first discharge hole 221 of the upper cover 220 and the second hole 331 of the bottom cap 330.

In addition, the gas moving to the exhaust pillar 310 moves in the opposite direction through the exhaust pipe 340 connected to the exhaust pillar 310 and then is discharged out of the cover 400 through the first hole 321 formed in the top cap 320 of the exhaust pillar 310 located in the opposite direction to the first discharge hole 221 and the second discharge hole 410 of the cover 400.

Here, the case 200 is made of a metal plate or a mica plate, and the first discharge hole 221 and the second discharge hole 410 are located in opposite directions to each other, so the flame generated by ignition of the battery cell inside the case 200 cannot be discharged.

By doing so, when a flame occurs in the battery cell, there is an effect that gas is discharged to the outside of the case 200 but the flame is prevented from leaking out.

Figure 10:
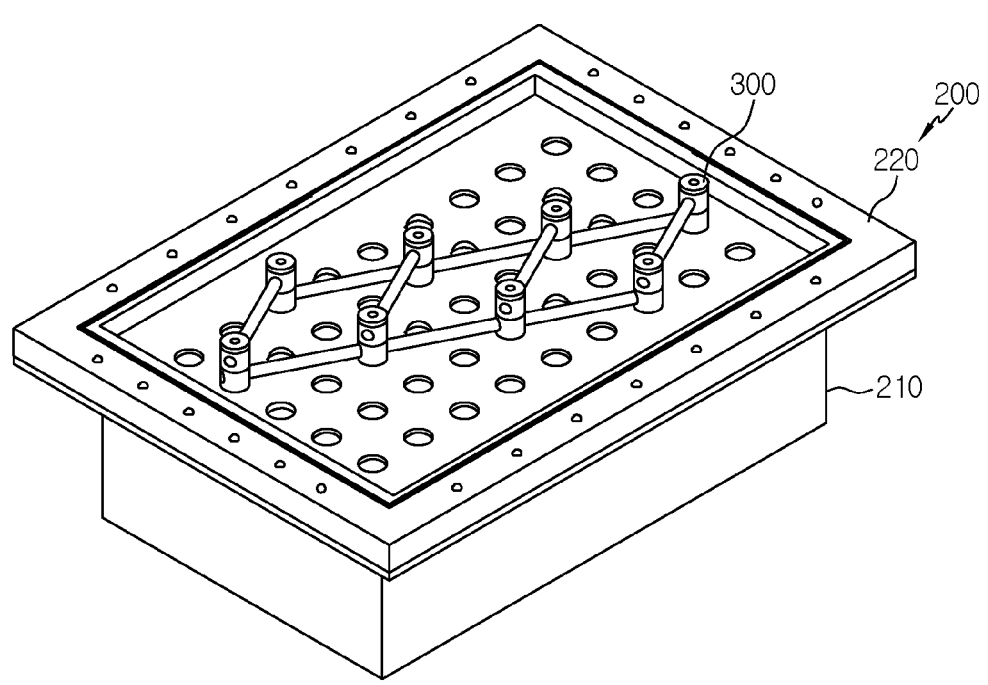

Referring to FIGS. 9 to 11, the exhaust path member 300 may be provided in various ways. That is, the location of the second exhaust unit 410 may be changed, or the path of the exhaust path member 300 may be formed differently.

For example, when a driver is located at an upper side of the battery module 10 according to one embodiment, the position of the second discharge unit 410 and the path of the exhaust path member 300 may be formed differently so that gas is discharged to a position where the driver is not present.

Meanwhile, a battery pack (not shown) according to another embodiment of the present disclosure may include at least one battery module 10 according to an embodiment of the present disclosure as described above. Also, in addition to the battery modules 10, the battery pack (not shown) may further include a housing for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example a predetermined vehicle (not shown) provided to use electricity such as an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery module, a battery pack and a vehicle including the same, and in particular, it may be used in industries related to secondary batteries.

What is claimed is:

1. A battery module, comprising:

a battery cell stack in which a plurality of battery cells are stacked;

a case configured to accommodate the battery cell stack and having at least one first discharge hole formed to discharge gas;

an exhaust path member having an interior communicating with the at least one first discharge hole and mounted to the case to provide a discharge path of the gas so as to discharge the gas; and a cover coupled to the case to cover the exhaust path member and having at least one second discharge hole through which the gas moving through the exhaust path member is discharged, wherein the exhaust path member comprises:

a first pillar having an interior in fluid communication with the at least one first discharge hole;

a second pillar having an interior in fluid communication with the at least one second discharge hole; and an exhaust pipe extending between the first pillar and the second pillar, the exhaust pipe being in fluid communication with the interior of the first pillar and the interior of the second pillar.

2. The battery module according to claim 1, wherein the at least one first discharge hole formed in the case and the at least one second discharge hole formed in the cover are formed in opposite sides of the battery module, and wherein the gas flows into the exhaust path member from the at least one first discharge hole, moves through the exhaust path member, and flows out through the at least one second discharge hole.

3. The battery module according to claim 2, wherein the case includes:

a lower cover configured to accommodate the battery cell stack; and an upper cover coupled to the lower cover and having a plurality of mounting grooves at which the exhaust path member is mounted and having the at least one first discharge hole formed therein, wherein the cover is coupled to the upper cover, and the exhaust path member is located between the cover and the upper cover.

4. The battery module according to claim 3, wherein the exhaust path member is mounted to the plurality of mounting grooves so that the interior communicates with the at least one first discharge hole.

5. The battery module according to claim 4, wherein the exhaust path member includes:

a plurality of exhaust pillars respectively mounted to the plurality of mounting grooves; and a plurality of exhaust pipes configured to connect the plurality of exhaust pillars with each other.

6. The battery module according to claim 5, wherein each of the plurality of exhaust pillars includes:

an upper part having a first connection hole connected to a first exhaust pipe of the plurality of exhaust pipes and having a hollow inside;

a lower part coupled to the upper part, having a second connection hole connected to a second exhaust pipe of the plurality of exhaust pipes, and having a hollow inside; and an inner shaft inserted into a portion where the upper part and the lower part are connected, the inner shaft having a first movement hole communicating with the first connection hole and a second movement hole communicating with the second connection hole, the inner shaft having a hollow inside.

7. The battery module according to claim 6, wherein each of the plurality of exhaust pillars further includes:

a top cap having a first hole and coupled to the upper part; and a bottom cap having a second hole and coupled to the lower part.

8. The battery module according to claim 6, wherein the upper part and the lower part are rotatably coupled with each other.

9. The battery module according to claim 8, wherein the plurality of exhaust pillars are respectively connected to the plurality of exhaust pipes, and wherein the exhaust path member is configured to be expandable by rotation of the upper part and the lower part.

10. The battery module according to claim 7, wherein the first hole is configured to communicate with the at least one second discharge hole of the cover, and the second hole is configured to communicate with the at least one first discharge hole of the case.

11. The battery module according to claim 7, further comprising:

a closing member configured to close at least one of the first connection hole and the second connection hole.

12. The battery module according to claim 1, further comprising:

a plate made of mica with heat insulation and heat resistance to prevent flame from leaking.

13. A battery pack, comprising the battery module according to claim 1.

14. A vehicle, comprising the battery module according to claim 1.

15. The battery module according to claim 1, wherein the case includes:

a lower cover configured to accommodate the battery cell stack;

an upper cover coupled to the lower cover; and a plurality of mounting grooves formed in the upper cover, at least one mounting groove having the at least one first discharge hole, wherein the exhaust path member is retained in the plurality of mounting grooves.

* * * * *